Jan. 10, 1939.   R. E. J. NORDQUIST   2,143,026
TRANSFER MECHANISM FOR ARTICLES
Filed April 4, 1935   2 Sheets-Sheet 1

INVENTOR
Ronald E. J. Nordquist
BY
ATTORNEYS

Jan. 10, 1939.     R. E. J. NORDQUIST     2,143,026
TRANSFER MECHANISM FOR ARTICLES
Filed April 4, 1935     2 Sheets-Sheet 2
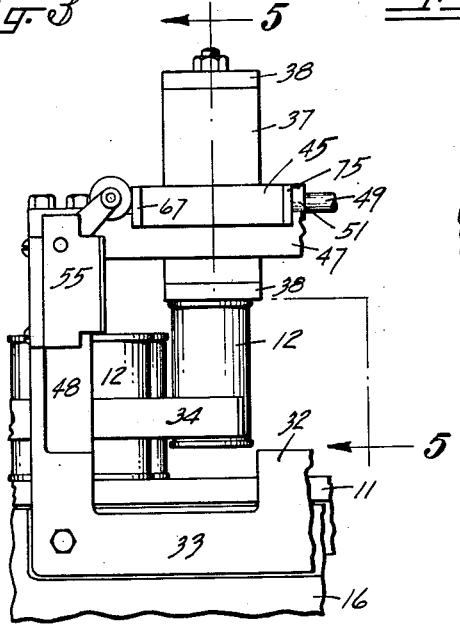
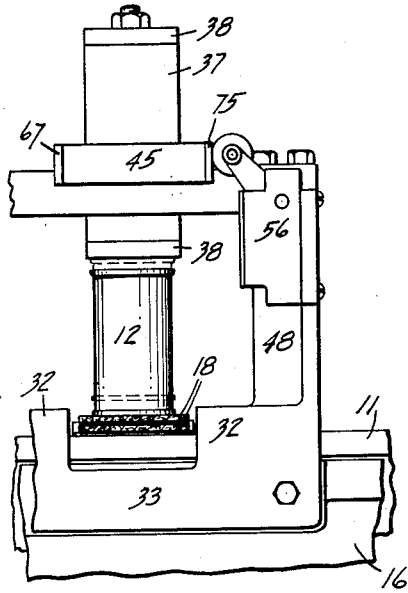
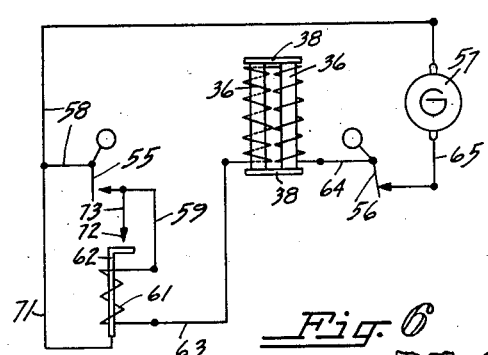
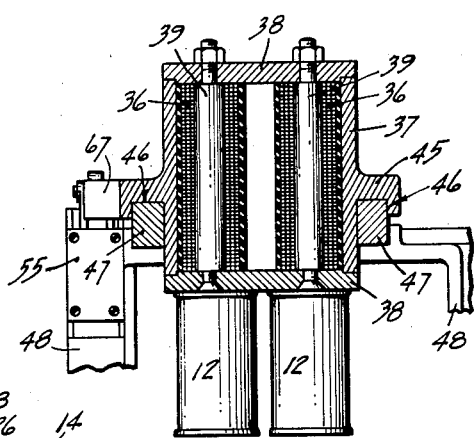
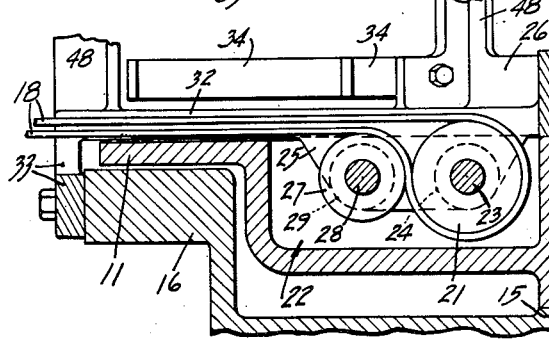

Patented Jan. 10, 1939

2,143,026

UNITED STATES PATENT OFFICE 2,143,026

TRANSFER MECHANISM FOR ARTICLES

Ronald E. J. Nordquist, Maplewood, N. J., assignor to American Can Company, New York, N. Y., a corporation of New Jersey Application April 4, 1935, Serial No. 14,699

5 Claims. (Cl. 198—20)

The present invention relates to a conveyor transfer mechanism for articles such as metallic containers or cans and has particular reference to electro-magnetic devices for transferring cans from one conveyor to another.

In the packaging of beverages such as beer or the like, it has been found that the tin can possesses numerous advantages over the ordinary bottle which is in common use. When pasteurizing the beer in the cans, however, difficulty has been experienced in discharging the cans from the pasteurizing machine. Particularly is this so in the rotating disc type of pasteurizer wherein the cans are carried on a rotating disc from which they are to be discharged by a conveyor crossing over the top of the disc at substantially right angles to the disc travel.

The present invention has been found to be particularly adaptable to a can transfer mechanism for transferring the cans from the disc to the conveyor of such a pasteurizer, although it should be understood that the invention has many other useful purposes and advantages in other kinds of machines wherever it is desired to transfer metal cans or other articles from one support to another.

An object of the invention is the provision of electro-magnetic can transfer devices for a pasteurizing machine or the like wherein the cans are transferred from a continuously rotating disc or can support to a discharge or other conveyor disposed at a higher level and having a different direction of travel.

Another object is the provision of such an electro-magnetic can transfer device for a pasteurizing machine wherein the cans are carried on the disc in a mass from which they are transferred individually or in groups as desired to a suitable discharge conveyor on which they are deposited in a predetermined aligned arrangement.

Numerous other objects and advantages of the invention will be apparent as it is better understood from the following description, which, taken in connection with the accompanying drawings, discloses a preferred embodiment thereof.

Referring to the drawings:

Fig. 3 is a fragmentary side elevation similar to Fig. 1 and illustrating the mechanism shown on the left of that figure with parts in a different position;

Fig. 4 is a similar view illustrating the right hand portion of Fig. 1 with parts of the mechanism in a different position;

Fig. 5 is a fragmentary transverse sectional view taken substantially along the broken line 5—5 in Fig. 3;

Fig. 6 is a fragmentary transverse section taken substantially along the broken line 6—6 in Fig. 2; and Fig. 7 is a wiring diagram of the electric controls used in the mechanism.

Figure 1:
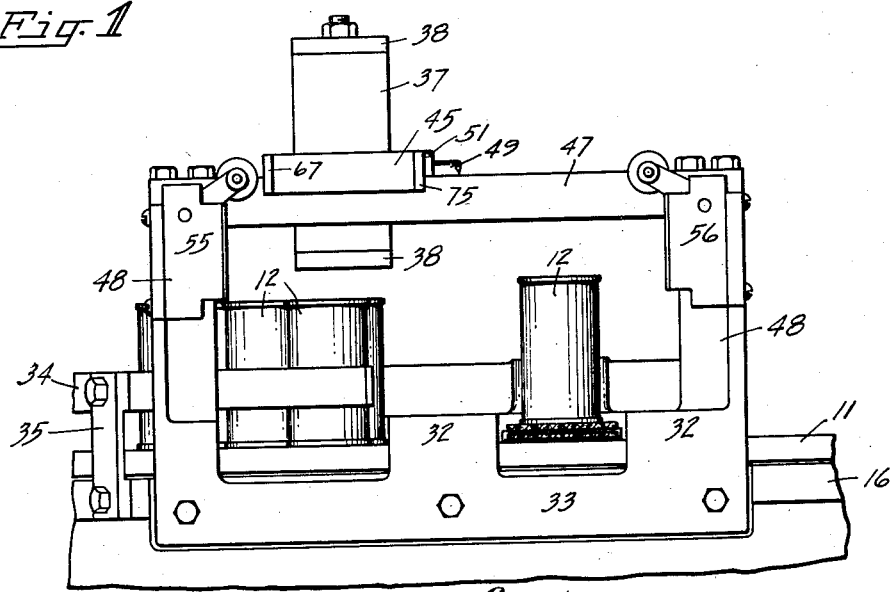
Figure 1 is a side elevation of a can transfer mechanism for conveyors embodying the instant invention, parts being broken away.

In the mechanism illustrated in the drawings the cans to be transferred are or may be massed or irregularly assembled as they are filled, as by being pushed one after another on to a support or disc, and are preferably discharged by an auxiliary endless belt conveyor which crosses over the top of the disc at a slightly higher level. The cans do not at first engage the conveyor directly but are held back by a stop disposed adjacent the side of the conveyor and against which they accumulate as the disc rotates.

An overhead traveling electro-magnet device plying between the accumulated cans and the conveyor picks up a group of cans from the mass, aligns them substantially parallel with the conveyor and then transfers them in this alignment to the conveyor. Thus the cans are discharged from the mass on the disc in an orderly procession.

A preferred form of mechanism embodying the invention comprises a rotary discharge disc or movable horizontal support 11 (Figs. 1, 2 and 6) which carries metallic cans 12. The disc is provided with a hub 13 keyed to a vertical shaft 14 journaled in a bearing 15 formed in a frame 16 which may be the main frame of a suitable can treating machine. The shaft is continuously rotated in any suitable manner.

Cans 12 are discharged from the disc 11 by can receiving instrumentalities comprising an endless belt or auxiliary conveyor 18 disposed radially of the disc and having both its upper and lower runs crossing over the top of the disc. Belt 18 takes over a pulley 21 which is located in an annular channel 22 formed in the disc. The pulley is mounted on a shaft 23 the ends of which are carried in bearings 24 formed in webs 25 depending from a horizontal bracket 26 and extending down into the channel 22.

The lower run of the belt 18 is directed up and over an idler pulley 27 so as to extend over the top of the disc directly under the upper run (Fig. 6). The idler pulley is disposed in the channel 22 adjacent the pulley 21 and is mounted on a shaft 28 the ends of which are carried in bearings 29 formed in the depending webs 25. This belt conveyor is driven in any suitable manner exteriorly of the mechanism.

One end of the bracket 26 is supported by a bearing 31 which rests on top of the disc hub 13 and in which the upper end of the shaft 14 rotates. The bracket extends forward on either side of the auxiliary conveyor over the top of the disc 11 and is formed with legs 32. These legs merge into a connecting outer frame 33 which is bolted to the main frame 16. It is one of these legs 32 (the left as viewed in Fig. 2) which constitutes a can stop instrumentality, this leg being engaged by the cans carried on the disc 11. These cans accumulate against the leg and are thus prevented from engaging the side of the belt conveyor 18. Curved guide bars 34 hold the cans in place, these being secured to brackets 35 which are bolted to the main frame 16 adjacent the outer and inner edges of the disc.

An overhead electro-magnetic transfer device is provided for transferring the accumulated cans from the disc 11 and for lifting them to the higher level of the conveyor 18. This transfer is effected in the present instance by a pair of electro-magnets 36 (Figs. 1, 2 and 5) which are vertically disposed in a housing 37 which has non-magnetic top and bottom members 38 which may be made of brass or the like material. Cores 39 of the magnets extend through the members 38, being riveted in the bottom member and threadedly secured by nuts in the top member. The two magnets are positioned in the housing side by side in spaced relation and are arranged with their centers in a line parallel with the line of travel of the auxiliary conveyor 18. The non-magnetic members 38 thus allow maintenance of the individual magnetic attraction properties of the magnets, such attraction being concentrated in their individual cores for a purpose hereinafter to be explained.

The magnet housing 37 moves back and forth on a slideway above the top of the auxiliary conveyor and above the cans accumulated adjacent the bracket leg 32. The housing is formed with laterally extending lugs 45 having bottom grooves 46 which accommodate the supports for the slideway just mentioned, these supports being a pair of spaced and parallel slide bars 47. The ends of the slide bars are bolted on top of vertical leg extensions 48 of the bracket 26.

The magnet housing is actuated in its travel over the slide bars 47 by any suitable means as through a rod 49. One end of the rod is threadedly engaged in a boss 51 formed on a rib 52 of the housing.

The magnets 36 may be energized and deenergized to pick up and release the cans in proper time with the sliding movement of the housing. This is preferably effected by a pair of electric switches 55, 56 Fig. 1, which are secured to the upper ends of the forward pair of leg extensions 48.

These switches are electrically included in an electric circuit (Fig. 7) which connects the magnets 36 with a suitable source of electric energy such as a generator 57. One side of the generator is connected by a service wire 58 to one terminal of the switch 55 which switch is normally open. The opposite terminal of the switch is connected by a wire 59 to one end of a circuit holding solenoid 61 having a movable core 62.

The other end of the solenoid is connected by a wire 63 to one of the magnets 36, and these magnets are connected together. The other magnet is connected by a wire 64 to one terminal of the switch 56. This latter switch is normally closed and has its opposite terminal connected by a wire 65 to the other side of the generator 57.

Figure 2:
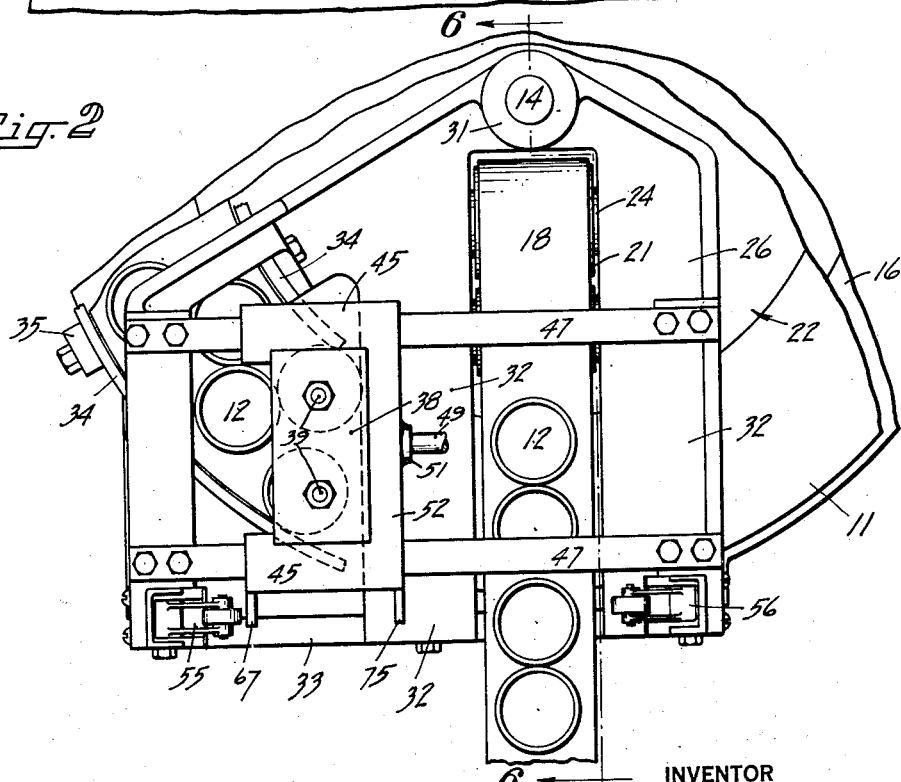
Fig. 2 is a top plan view of the mechanism illustrated in Fig. 1, with parts broken away.

When the magnets 36 are moved over the accumulated cans 12 as shown in Figs. 1 and 2, a lug 67 formed on the side of the housing lug 45 engages the movable element of the switch 55 and in the extreme position of movement momentarily closes the switch. The magnet circuit being closed current flows from the generator through the circuit and energizes the magnets and also the solenoid 61. Each of the energized magnets immediately draws up a can out of the mass if such a can is located within reach of the magnetic field of the magnet, the magnets holding the attracted cans against the bottom housing member 38 as shown in Fig. 3. So held these cans are ready for transfer to the conveyor 18 upon movement of the magnet housing in that direction.

Provision is made for holding the magnets energized during this travel. This is effected by a holding circuit (Fig. 7) which includes the solenoid core 62 but which does not include the switch 55. One end of the core is connected by a wire 71 to the service wire 58. The other end of the core is in alignment with a contact point 72 which is connected by a wire 73 to the wire 59. Thus when the solenoid 61 is energized by the closing of the switch 55 the core 62 moves into engagement with the contact 72, and thereby completes the new or holding circuit which excludes the switch 55. When the switch 55 is opened as the magnet housing moves away, the magnets are held energized by the holding circuit.

As the housing carries the magnets and the held cans into position over the top of auxiliary conveyor 18, a lug 75 (Fig. 2) spaced from the lug 67 and also formed on the slide lug 45, engages the switch 56. This momentarily opens the latter and breaks the holding circuit. As the magnets are thus deenergized the cans are released and drop onto the conveyor 18 as shown in Fig. 4. This conveyor moving continuously carries them off to any suitable place of deposit.

It should be noted in this transfer that the cans are selected from an irregular mass and it has been found that in being attracted by the energized magnets they are shifted toward a centralizing line of force which brings each can center to substantially the center of its associated magnet which thus brings the unaligned cans into alignment in a straight line longitudinally of and parallel with the belt conveyor 18. It is for this purpose that the magnets are spaced apart as hereinbefore mentioned so that sufficient clearance will be provided for the cans to shift into aligned position while being attracted. This alignment of cans and magnet centers results in part by reason of the magnetic aligning forces being concentrated centrally of the magnetic cores 39 as previously described. Following this transfer to the belt conveyor the cans are carried away in an orderly, aligned manner.

The position of the cans on the conveyor 18 when released depends upon the arrangement of the magnets in the housing 37 and it should be understood that this arrangement as well as the number of magnets used may be selected at will to obtain any desired number of rows of cans and any number of cans in a row. In this way definite desired can position on the conveyor results, it being understood that it is particularly desirable to locate the cans along the longitudinal center of the conveyor belt. Since the cans while in their irregular mass may not completely fill a given area there are often skips in the longitudinal spacing of the cans as arranged on the conveyor belt, but such irregularity is not objectionable since the purpose of this magnetic transfer is to insure that the cans are aligned upon the conveyor belt.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A transfer mechanism for articles comprising in combination, means for supporting articles arrested in an irregular mass, conveyor means for receiving the articles, an element movable between said supporting means and said conveyor means for delivering the articles to the latter, and an electro-magnet on said movable element and adapted to be moved adjacent to and spaced from the arrested articles on said supporting means, said magnet being operated while in such spaced position to magnetically pick up an article from the mass and centralize it relative to the magnet so that it will be aligned with the conveyor in a predetermined position when it is delivered to the conveyor by movement of said element.

2. A transfer mechanism for articles comprising in combination, means for supporting articles in an irregular mass, conveyor means for receiving the articles, an element movable between said supporting means and said conveyor means for delivering the articles to the latter, an electro-magnet on said movable element and adapted to be moved adjacent to and spaced from the articles on said supporting means, said magnet being operated while in such spaced position to magnetically pick up an article from the mass and substantially centralize it relative to the magnet so that it will be aligned with the conveyor in a predetermined position when it is delivered to the conveyor by movement of said element, and means for energizing and de-energizing said electro-magnet so as to pick up and deliver the articles.

3. A transfer mechanism for articles comprising in combination, means for supporting articles in an irregular mass, conveyor means for receiving the articles, an element movable between said supporting means and said conveyor means for delivering the articles to the latter, and a plurality of separated electro-magnets on said movable element longitudinally disposed parallel with said conveyor means and adapted to be moved adjacent to and spaced from the articles on said supporting means, said magnets being operated while in such spaced position to magnetically pick up articles from the irregular mass, the separated relation of said electro-magnets providing clearance between them so that the picked up articles are magnetically positioned in a straight line parallel with the conveyor so that they are placed in a predetermined position on the conveyor by movement of said element.

4. A transfer mechanism for articles comprising in combination, means for supporting articles in an irregular mass, conveyor means for receiving the articles, an element movable between said supporting means and said conveyor means for delivering the articles to the latter, an electro-magnet on said movable element and adapted to be moved adjacent to and spaced from the articles in the irregular mass on said supporting means, and means for creating a magnetic field around said electro-magnet and extending into said irregular mass while in such position for picking up an article and positioning it relative to the magnet so that it will be aligned with the conveyor in a predetermined position when it is delivered to the conveyor by movement of said element.

5. A transfer mechanism for articles comprising in combination, means for supporting articles arrested in an irregular mass, conveyor means for receiving the articles, an element movable between said supporting means and said conveyor means for delivering the articles to the latter, and an electro-magnet on said movable element and adapted to be moved adjacent to and spaced from the arrested articles on said supporting means, said magnet being operated while in such spaced position to magnetically pick up an article from the mass and position it relative to the magnet so that it will be aligned with the conveyor in a predetermined position when it is delivered to the conveyor by movement of said element.

RONALD E. J. NORDQUIST.